(12) United States Patent
Kabasawa

(10) Patent No.: US 6,252,747 B1
(45) Date of Patent: Jun. 26, 2001

(54) DISK APPARATUS HAVING AN IMPROVED HEAD CARRIAGE STRUCTURE

(75) Inventor: Hidetoshi Kabasawa, Saitama-Ken (JP)

(73) Assignee: TEAC Corporation, Tokyo (JP)

( * ) Notice: Subject to any disclaimer, the term of this patent is extended or adjusted under 35 U.S.C. 154(b) by 0 days.

(21) Appl. No.: 09/191,006

(22) Filed: Nov. 12, 1998

(30) Foreign Application Priority Data

Nov. 13, 1997 (JP) .................................. 9-312366

(51) Int. Cl.[7] ................................................ G11B 5/55
(52) U.S. Cl. .................................. 360/266.5; 360/266.6; 369/249
(58) Field of Search .......................... 360/106, 266.4, 360/266.5, 266.6; 369/215, 219, 244, 249; 310/13

(56) References Cited

U.S. PATENT DOCUMENTS

| | | | |
|---|---|---|---|
| 3,656,015 | * 4/1972 | Gillum | 310/13 |
| 4,003,059 | 1/1977 | Sugiura et al. | 346/108 |
| 4,393,425 | * 7/1983 | Wright | 360/105 |
| 4,415,941 | * 11/1983 | Gibeau et al. | 360/106 |
| 4,427,905 | * 1/1984 | Sutton | 310/13 |
| 4,571,649 | * 2/1986 | Goss | 360/106 |
| 4,581,529 | 4/1986 | Gordon | 250/227 |

(List continued on next page.)

FOREIGN PATENT DOCUMENTS

| | | |
|---|---|---|
| 0460890A2 | 12/1991 | (EP) . |
| 0650133A2 | 4/1995 | (EP) . |
| 0712121A2 | 5/1996 | (EP) . |
| 2016744A | 9/1979 | (GB) . |
| 59-117180 | 6/1984 | (JP) . |
| 4-370532 | 12/1992 | (JP) . |
| WO95/02243 | 1/1995 | (WO) . |
| WO95/13638 | 5/1995 | (WO) . |
| WO98/06095 | 2/1998 | (WO) . |
| WO98/07060 | 2/1998 | (WO) . |

OTHER PUBLICATIONS

T. Hirano et al., "Invar Mems Milliactuator For Hard Disk Drive Application," (Jan. 1997), IEEE, pp. 378–382.

K. Petersen, "Silicon Torsional Scanning Mirror," (Sep. 1980), IBM J. Res. Devel. vol. 24, No. 5, pp. 631–637.

V.P. Jaecklin et al., "Optical Microshutters And Torsional Micromirrors For Light Modulator Arrays," (Feb. 1993), IEEE, pp. 124–127.

R.M. Boysel et al., "Integration of Deformable Mirror Devices With Optical Fibers And Waveguides," (1992), SPIE vol. 1793, Int. Optics and Microstructures, pp. 31–39.

M.J. Daneman et al., "Laser–To–Fiber Coupling Module Using A Micromachined Alignment Mirror," (Mar. 1996), IEEE Photonics Tech. Ltrs., vol. 8, No. 3, pp. 396–397.

D.L. Dickensheets et al., "Micromachined Scanning Confocal Optical Microscope," (May 15, 1996), Optics Ltrs., vol. 21, No. 10, pp. 764–765.

Primary Examiner—Brian E. Miller
(74) Attorney, Agent, or Firm—Anderson, Kill & Olick P.C.

(57) ABSTRACT

A disk apparatus includes a read/write head which reads information from or writes information to a recording disk. A movable head carriage supports the head thereon. The head carriage is movably supported on a guide shaft, and the guide shaft guides a movement of the head carriage. A head actuator exerts an actuating force on the head carriage to move the head, supported on the head carriage, in a radial direction of the disk. In the disk apparatus, the head carriage has a center of gravity at a position biased from a centerline of the head carriage and adjacent to the guide shaft, and the head actuator is attached to a side of the head carriage and has a centerline at a position adjacent to the guide shaft.

6 Claims, 6 Drawing Sheets

U.S. PATENT DOCUMENTS

| | | | |
|---|---|---|---|
| 4,613,962 | * 9/1986 | Inoue et al. | 318/135 |
| 4,740,946 | * 4/1988 | Yumura et al. | 369/219 |
| 4,823,219 | * 4/1989 | Ueda et al. | 360/106 |
| 4,922,477 | * 5/1990 | Miura | 369/221 |
| 4,945,400 | 7/1990 | Blonder et al. | 357/74 |
| 4,974,107 | * 11/1990 | Liu et al. | 360/106 |
| 5,119,361 | 6/1992 | Tanabe | 369/121 |
| 5,130,972 | * 7/1992 | Mizuno et al. | 369/215 |
| 5,138,605 | * 8/1992 | Shtipelman et al. | 369/215 |
| 5,212,582 | 5/1993 | Nelson | 359/224 |
| 5,253,245 | 10/1993 | Rabedeau | 369/119 |
| 5,291,473 | 3/1994 | Pauli | 369/112 |
| 5,313,442 | 5/1994 | Ohtsuka et al. | 369/44.16 |
| 5,325,116 | 6/1994 | Sampsell | 346/108 |
| 5,331,454 | 7/1994 | Hornbeck | 359/224 |
| 5,422,872 | 6/1995 | Hsu et al. | 369/97 |
| 5,432,763 | 7/1995 | Campbell et al. | 369/44.19 |
| 5,444,566 | 8/1995 | Gale et al. | 359/291 |
| 5,448,546 | 9/1995 | Pauli | 369/112 |
| 5,491,680 | 2/1996 | Pauli | 369/112 |
| 5,504,731 | 4/1996 | Lee et al. | 369/112 |
| 5,532,997 | 7/1996 | Pauli | 369/112 |
| 5,536,926 | 7/1996 | Ikeda et al. | 235/462 |
| 5,625,483 | 4/1997 | Swartz | 359/224 |
| 5,629,790 | 5/1997 | Neukermans et al. | 359/198 |
| 5,737,302 | 4/1998 | Kasahara | 369/118 |
| 5,740,150 | 4/1998 | Uchimaru et al. | 369/119 |
| 5,742,419 | 4/1998 | Dickensheets et al. | 359/201 |
| 5,828,482 | 10/1998 | Jain | 359/211 |
| 5,982,588 | * 11/1999 | Jones et al. | 360/106 |

* cited by examiner

DISK APPARATUS HAVING AN IMPROVED HEAD CARRIAGE STRUCTURE

BACKGROUND OF THE INVENTION (1) Field of the Invention

The present invention relates to a disk apparatus in which a head carriage with a read/write head supported thereon is shifted in a radial direction of a disk by a head actuator and the head reads information from or writes information to the disk.

(2) Description of the Related Art

Many personal computers and wordprocessors employ a magnetic disk drive as a storage device. In the magnetic disk drive, a disk cartridge, accommodating a magnetic disk, is inserted and placed at a disk-loaded position within the magnetic disk drive, a read/write head is shifted in a radial direction of the disk, and the read/write head accesses the disk when the disk is rotated.

The magnetic disk drive of the above type includes a disk holder and a slider which constitute a disk transporting mechanism. The disk holder holds the disk cartridge, and the disk cartridge is inserted into or ejected from the disk holder. The slider is moved by the insertion of the disk cartridge, and the disk holder is moved from an insert/eject position to a disk-loaded position by the movement of the slider.

The magnetic disk drive of the above type includes a head carriage having a head arm on which an upper head is supported and a carriage body on which a lower head is supported. When the disk cartridge inserted in the disk holder is placed at the disk-loaded position, the lower head of the head carriage is brought into contact with the bottom surface of the disk, and the head arm of the head carriage is lowered so as to bring the upper head into contact with the top surface of the disk. By using the upper and lower heads in this condition, the magnetic disk drive accesses the disk when the disk is rotated.

Recently, the use of a large-capacity magnetic disk has grown, and there is an increasing demand for a magnetic disk drive capable of speedily accessing the large-capacity magnetic disk at a high recording density. For use in such a disk drive, a read/write head which is levitated from the disk by an air flow between the disk and the head when the disk is rotated at a high speed is known.

In the magnetic disk drive of the above, the head carriage with the read/write head supported thereon is shifted in a radial direction of the disk by an actuating force of a voice coil motor so as to perform a seek of the read/write head for a desired location of the disk.

Further, there are known two kinds of head carriage mechanism which are used by existing magnetic disk drives to achieve the above-described function: (1) a head carriage mechanism in which a pair of voice coil motors are provided on both sides of the head carriage; and (2) a head carriage mechanism in which a single voice coil motor is provided in the center of the lower part of the head carriage.

In the head carriage mechanism of the kind (1) above, it is necessary that two voice coil motors are provided on the sides of the head carriage, and the cost becomes high and the weight becomes large. The head carriage mechanism of this kind has some disadvantages. For example, during an impact test, a large force is exerted by the head carriage due to the large weight. Misalignment of the elements of the head carriage mechanism is likely to take place if a small error of the position of the disk drive is produced.

In the head carriage mechanism of the kind (2) above, the head carriage is shifted by using a single voice coil motor. The voice coil motor must be mounted in the head carriage mechanism of this kind such that the coil is located in the center of the lower part of the head carriage and the yoke passes through the center of the head carriage. Hence, the elements of the head carriage must be placed so as to match the mounted position of the voice coil motor. As a result, the total height of the head carriage mechanism becomes high. It is difficult to provide a small-size head carriage when the head carriage mechanism of this kind is used.

SUMMARY OF THE INVENTION

An object of the present invention is to provide an improved disk apparatus in which the above-described problems are eliminated.

Another object of the present invention is to provide a disk apparatus which provides a small-size, light-weight head carriage and provides a stable shifting movement of a read/write head.

The above-mentioned objects of the present invention are achieved by a disk apparatus comprising: a read/write head which reads information from or writes information to a recording disk; a movable head carriage which supports the head thereon; a guide shaft on which the head carriage is movably supported, the guide shaft guiding a movement of the head carriage; and a head actuator which exerts an actuating force on the head carriage to move the head, supported on the head carriage, in a radial direction of the disk, wherein the head carriage has a center of gravity at a position biased from a centerline of the head carriage and adjacent to the guide shaft, and the head actuator is attached to a side of the head carriage and has a centerline at a position adjacent to the guide shaft.

In the disk apparatus of a preferred embodiment of the present invention, the head carriage is shifted in a radial direction of the disk by a single voice coil motor. The disk apparatus of the preferred embodiment is effective in providing a stable shifting movement of the read/write head of the head carriage. In comparison with a head carriage mechanism in which a pair of voice coil motors are provided on the sides of the head carriage, the disk apparatus of the preferred embodiment is more effective in providing a light-weight, small-size head carriage. The disk apparatus of the preferred embodiment can reduce a shifting space needed to move the head carriage within the disk apparatus, and this makes it possible to provide a small-size disk drive. Further, the disk apparatus of the preferred embodiment provides a light-weight head carriage and does not produce an excessively large force during an impact test, and it is effective in providing a good impact resistance.

BRIEF DESCRIPTION OF THE DRAWINGS

Other objects, features and advantages of the present invention will be more apparent from the following detailed description when read in conjunction with the accompanying drawings in which.

DETAILED DESCRIPTION OF THE PREFERRED EMBODIMENT

A description will now be given of the preferred embodiment of the present invention with reference to the accompanying drawings.

Figure 1:
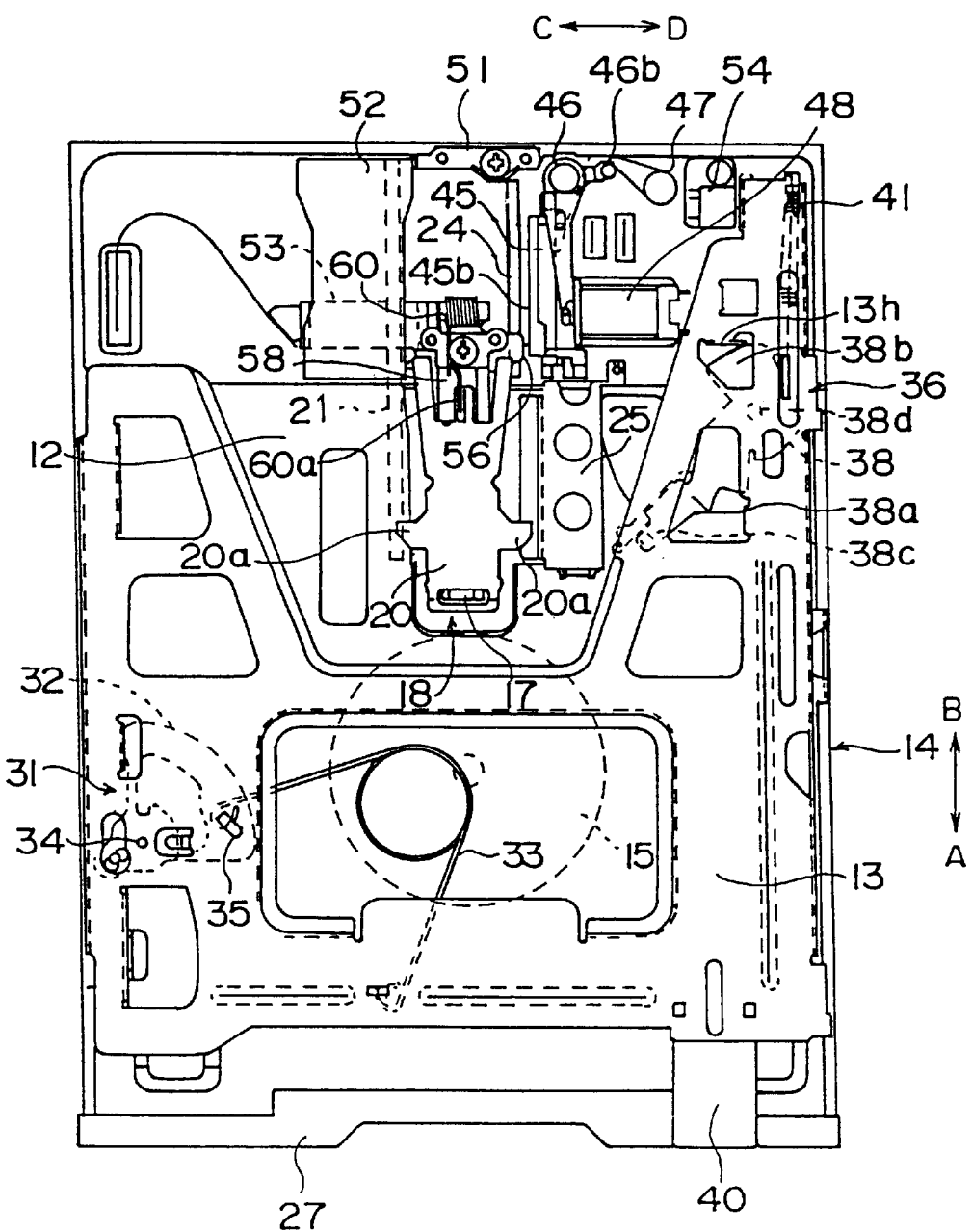
FIG. 1 is a top view of one embodiment of a disk apparatus of the present invention.
Figure 2:
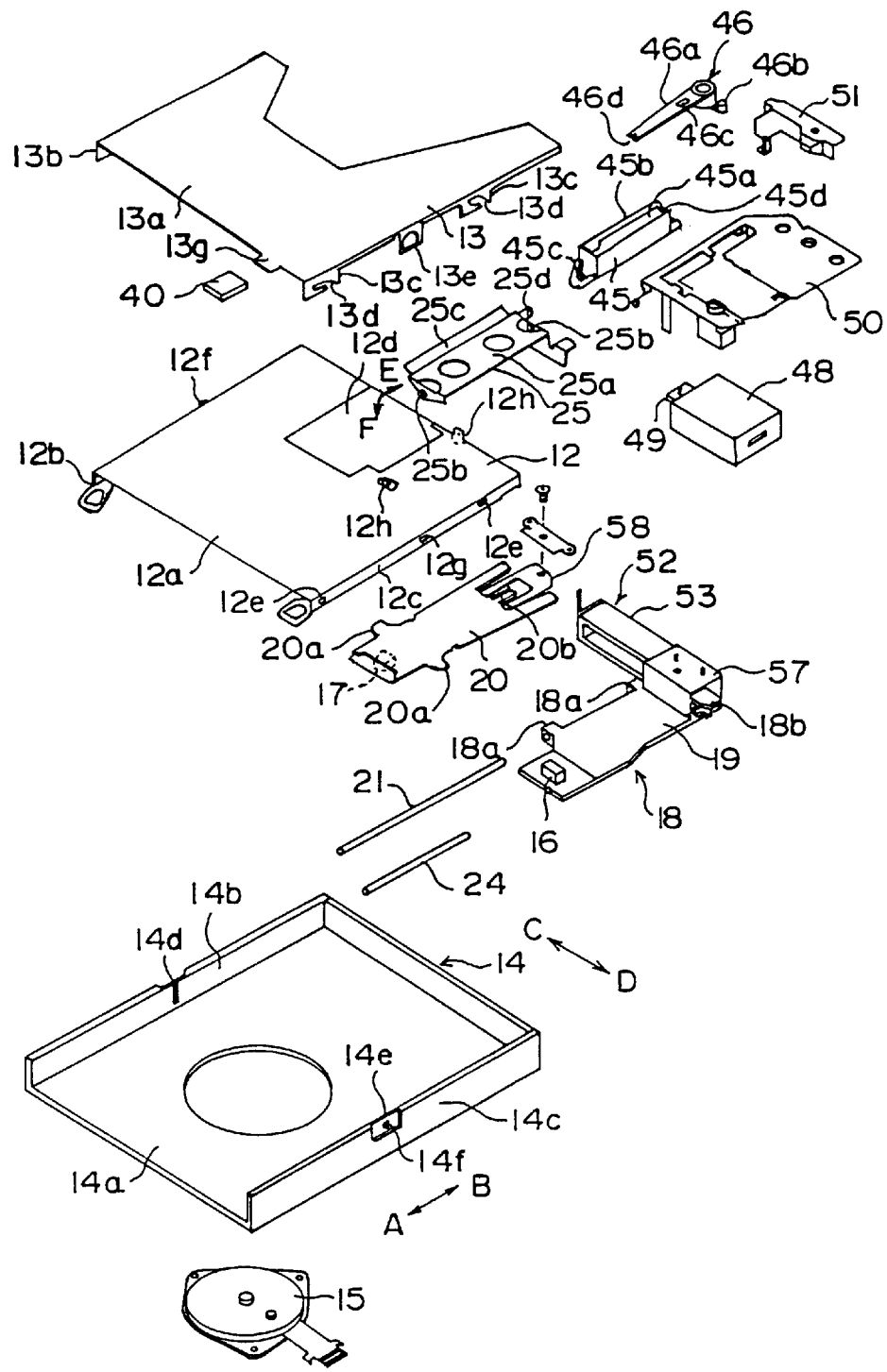
FIG. 2 is an exploded view of an essential part of the disk apparatus.

FIG. 1 is a top view of one embodiment of the disk apparatus of the present invention. FIG. 2 is an exploded view of an essential part of the disk apparatus.

The disk apparatus in the present embodiment is a magnetic disk drive which reads information from or writes information to a magnetic disk of a disk cartridge placed at a loaded position in the disk drive.

As shown in FIG. 1 and FIG. 2, the disk apparatus 11 includes a disk holder 12 and a slider 13 which are mounted on a chassis 14. A disk cartridge (not shown), accommodating a magnetic disk therein, is inserted into or ejected from the disk holder 12. The slider 13 is provided to be movable relative to the chassis 14 in one of a forward direction (indicated by the arrow "A" in FIG. 1) and a backward direction (indicated by the arrow "B" in FIG. 1). The disk holder 12 is moved up or down between an insert/eject position and a disk-loaded position by a movement of the slider 13 which is one of the forward direction A and the backward direction B.

Specifically, when the disk cartridge is inserted into the disk apparatus 11, the slider 13 is moved relative to the chassis 14 in the forward direction A, and the disk holder 12 is vertically moved from the insert/eject position to the disk-loaded position by the forward movement of the slider 13. Reversely, when the disk cartridge is ejected from the disk apparatus 11, the slider 13 is moved relative to the chassis 14 in the backward direction B, and the disk holder 12 is vertically moved from the disk-loaded position to the insert/eject position by the backward movement of the slider 13.

The chassis 14 has a flat surface 14a. A turntable 15 and a head carriage 18 are provided on the surface 14a of the chassis 14. The turntable 15 is rotated by a disk rotating motor (not shown). The disk of the disk cartridge at the loaded position is placed onto the turntable 15, and rotated by the turntable 15. A lower head 16 and an upper head 17 are supported by the head carriage 18. A circuit board (not shown), including a control circuit, is mounted on the bottom of the chassis 14.

The head carriage 18 includes a carriage body 19 and a head arm 20. The lower head 16 is supported on the top of a front end of the carriage body 19. The head arm 20 is rotatably supported by a base of the head carriage 18. The upper head 17 is supported on the bottom surface of a front end of the head arm 20.

The head carriage 18 is movably supported on a guide shaft 21 and a guide shaft 24. The guide shaft 21 is a main guide shaft longer than the guide shaft 24 and supporting mostly the weight of the head carriage 18. The guide shaft 24 is a subsidiary guide shaft shorter than the guide shaft 21. The guide shafts 21 and 24 longitudinally extend in the directions A and B. Hence, the head carriage 18 is movable relative to the chassis 14 in one of the forward and backward directions A and B along the guide shafts 21 and 24. Bearing portions 18a are provided at intermediate positions on the left-hand side of the head carriage 18, and a bearing portion 18b is provided at a rear position on the right-hand side of the head carriage 18. The bearing portions 18a are fitted to the guide shaft 21, and the bearing portion 18b is fitted to the guide shaft 24. The head carriage 18 is movably supported on the guide shafts 21 and 24 by the bearing portions 18a and 18b.

The head carriage 18 is shifted in one of the forward direction A and the backward direction B along the guide shafts 21 and 24 by an actuating force of a voice coil motor 52. During a seek operation, the head carriage 18 with the heads 16 and 17 supported thereon is shifted in a radial direction of the disk to a desired location of the disk by the voice coil motor 52. After the head carriage 18 is shifted to the desired location of the disk, the heads 16 and 17 act to read information from or write information to the disk.

In the above-described embodiment, the voice coil motor 52 acts as a head actuator which shifts the head carriage 18 in one of the forward direction A and the backward direction B. Alternatively, a stepping motor and a lead screw may be provided to shift the head carriage 18 instead of the voice coil motor 52. In the alternative embodiment, the lead screw is connected with the head carriage 18, and the lead screw is rotated by the stepping motor so as to shift the head carriage 18 in one of the forward direction A and the backward direction B.

As shown in FIG. 1, a damper device 31 is provided on the bottom of the slider 13. The damper device 31 on the bottom of the slider 13 includes a damper plate 32 which is rotatably supported by a supporting shaft 34, and a latching portion 35 which connects one end of a helical torsion spring 33 with the slider 13.

The damper device 31 in the present embodiment is a mechanical damper device which exerts an actuating force of the spring 33 on the slider 13 through the damper plate 32 so as to decrease a moving speed of the slider 13 when the slider 13 is moved in one of the forward direction A and the backward direction B.

When the disk holder 12 is moved down from the insert/eject position to the disk-loaded position by the slider 13, the damper device 31 pushes the slider 13 in the opposite direction (or in the forward direction B) to the moving direction of the slider 12. When the slider 13 is moved relative to the chassis 14 in the backward direction B and the damper plate 32 is rotated over a given rotation amount, the damper device 31 pushes the slider 13 in the backward direction (or in the backward direction A) by the actuating force of the spring 33. Hence, the damper device 31 exerts the actuating force of the spring 33 on the slider 13 through the damper plate 32 so as to decrease the moving speed of the slider 13 when the disk cartridge is placed at the loaded position.

As shown in FIG. 2, the disk holder 12 includes a top plate 12a and a pair of cartridge guide portions 12b and 12c. The cartridge guide portions 12b and 12c are formed by bending side edges of the top plate 12a downward. An internal space of the disk holder 12, surrounded by the top plate 12a and the cartridge guide portions 12b and 12c, is used as a cartridge insertion space in which the inserted disk cartridge is accommodated.

In the top plate 12a of the disk holder 12, a rectangular opening 12d is provided. The head carriage 18 is movable within the opening 12d of the disk holder 12. A lifter 25 is rotatably fitted to the disk holder 12 on the right side of the opening 12d. The head arm 20 has a pair of laterally extending lugs 20a at front side positions of the head arm 20. The lugs 20a of the head arm 20 are connected to the lifter 25. When the disk holder 12 is vertically moved between the insert/eject position and the disk-loaded position, the upper head 17 of the head arm 20 is vertically moved by the connection of the head arm 20 and the lifter 25. In the disk apparatus 11 of the present embodiment, the disk holder 12, the head arm 20 and the lifter 25 constitute a head moving mechanism.

The lifter 25 includes, as shown in FIG. 2, a lifter body 25a and a pair of longitudinally extending shafts 25b at ends of the lifter body 25a. The disk holder 12 includes a pair of supporting portions 12h formed on the top plate 12a. The shafts 25b of the lifter 25 are rotatably supported by the supporting portions 12h such that the lifter 25 is rotatable around the shafts 25b in one of rotating directions (indicated by the arrows "E" and "F" in FIG. 2) perpendicular to the carriage movement directions A and B.

The disk holder 12 includes a pair of connecting pins 12e at each of front-end side positions and rear-end side positions of the disk holder 12. The connecting pins 12e laterally extend from the cartridge guide portions 12b and 12c of the disk holder 12. The connecting pins 12e are connected to the slider 13. Further, the disk holder 12 includes a pair of guide pins 12f and 12g at middle side positions of the disk holder 12. Similarly, the guide pins 12f and 12g laterally extend from the cartridge guide portions 12b and 12c of the disk holder 12. The chassis 14 includes side walls 14b and 14c, and guide grooves 14d and 14e are formed on the side walls 14b and 14c at middle positions thereof. The guide pins 12f and 12g of the disk holder 12 are fitted to the guide grooves 14d and 14e so as to guide the vertical movement of the disk holder 12 to the chassis 14.

The lifter 25 includes a connecting portion 25c which is connected with the lugs 20a of the head arm 20 so as to lift the head arm 20. The lifter 25 is rotatably supported on the top plate 12a of the disk holder 12 such that the lifter 25 is rotatable around the shafts 25b in one of the rotating directions E and F. The connecting portion 25c is connected with the lugs 20a in accordance with the vertical movement of the disk holder 12, and the head arm 20 is vertically moved through the connection of the lugs 20a and the connecting portion 25c. The connecting portion 25c has a longitudinal length corresponding to a distance between an innermost track and an outermost track of the disk. The length of the connecting portion 25c corresponds to a stroke of the head carriage 18 when shifted in one of the forward direction A and the backward direction B.

The slider 13 is movable on the top of the disk holder 12. The slider 13 includes, as shown in FIG. 2, a J-shaped flat plate 13a, side walls 13b, side walls 13c, slanted grooves 13d, and connecting holes 13e. The side walls 13b and 13c are formed by bending side edge portions of the flat plate 13a downward, and the side walls 13b and 13c extend vertically downward from the flat plate 13a. The slanted grooves 13d are provided on the side walls 13b and 13c. The laterally extending pins 12e of the disk holder 12 are fitted to the slanted grooves 13d, and, by using the connection of the pins 12e and the slanted grooves 13d, the disk holder 12 is vertically movable between the insert/eject position and the disk-loaded position by a movement of the slider 13 which is one of the forward direction A and the backward direction B. The chassis 14 includes projecting portions 14f on the side walls 14b and 14c at the middle positions thereof. The projecting portions 14f of the chassis 14 are fitted into the connecting holes 13e of the slider 13.

Further, the slider 13 includes a forward projecting lug 13g at a front right-hand edge of the slider 12. An eject button 40 is secured to the lug 13g of the slider 13. A helical compression spring 41 is fixed at one end to the chassis 14 and connected at the other end to the slider 13. The spring 41 exerts an actuating force on the slider 13 so as to pull the slider 13 in the forward direction A toward its original position.

Figure 3:
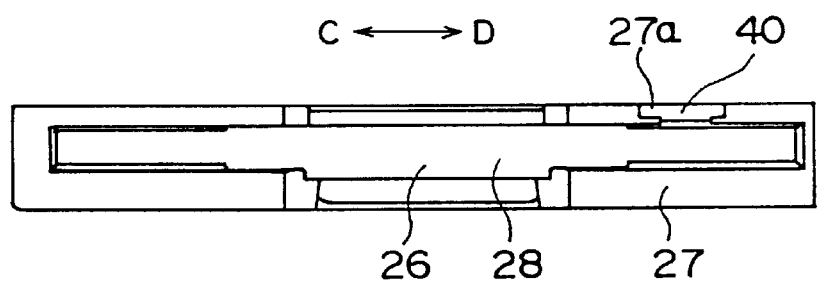
FIG. 3 is a front view of the disk apparatus.

FIG. 3 is a front view of the disk apparatus 11.

As shown in FIG. 3, a front bezel 27 is attached to the front edge of the chassis 14, and the front bezel 27 includes an insertion opening 26. By using the insertion opening 26, the disk cartridge containing the disk therein is inserted into or ejected from the disk holder 12. A recessed portion 27a is provided at an upper right-hand portion of the front bezel 27, and the eject button 40 is movably fitted to the recessed portion 27a. On the rear surface of the front bezel 27, a flap 28 is rotatably supported, and the flap 28 is actuated to close the insertion opening 26.

Figure 4:
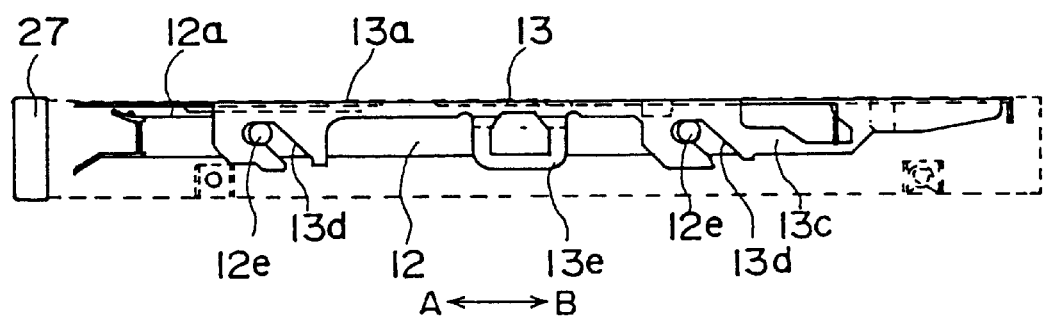
FIG. 4 is a side view of the disk apparatus in which a disk holder and a slider are mounted.

FIG. 4 is a side view of the disk apparatus 11 in which the disk holder 12 and the slider 13 are mounted.

As shown in FIG. 4, the pins 12e of the disk holder 12 are fitted to the slanted grooves 13d of the slider 13. By using the connection of the pins 12e and the slanted grooves 13d, the disk holder 12 is vertically movable between the insert/eject position and the disk-loaded position by a movement of the slider 13 which is one of the forward direction A and the backward direction B. Specifically, when the slider 13 is moved in the backward direction B, the disk holder 12 is lifted from the disk-loaded position to the insert/eject position. When the slider 13 is moved in the forward direction A, the disk holder 12 is lowered from the insert/eject position to the disk-loaded position. In the disk apparatus 11 of the present embodiment, the disk holder 12 and the slider 12 constitute a disk transporting mechanism.

Referring back to FIG. 1, in the disk apparatus 11 of the present embodiment, a latching device 36 is provided. The latching device 36 includes a latch lever 38 and the spring 41. The latch lever 38 is rotatably supported on an internal upper surface of the disk holder 12. The spring 41 is connected to the latch lever 38 as well as the slider 13. The spring 41 exerts an actuating force on the latch lever 38 so as to pull the latch lever 38 toward its original position, as well as exerts the actuating force on the slider 13 so as to pull the slider 13 in the forward direction A toward its original position.

The latch lever 38 includes a lever portion 38a and an arc-shaped latching portion 38b. The lever portion 38a functions to open or close a shutter (not shown) of the disk cartridge when inserted or ejected. The slider 13 has a connecting portion 13h formed therein, and the latching portion 38b is engaged with the connecting portion 13h.

When the disk cartridge is inserted into the disk holder 12, the latch lever 38 is rotated clockwise by the leading edge of the disk cartridge being inserted. The latching portion 38b is separated from the connecting portion 13h of the slider 13 by the rotation of the latch lever 38. Then, the slider 13 is moved in the forward direction A by the actuating force of the spring 41 because the slider 13 is released from the latching portion 38b of the latch lever 38.

When the latch lever 38 is rotated by the disk cartridge in the above-mentioned manner, a leading edge 38c of the lever portion 38a pushes the shutter of the disk cartridge in the opening direction, so as to expose the disk in the disk cartridge. In this condition, the upper head 16 and the lower head 17 can access the disk in the disk cartridge.

When the eject button 40 on the front bezel 27 is pressed in the backward direction B, the slider 13 is moved in the backward direction B. The latching portion 38b of the latch lever 38 is separated from the connecting portion 13h of the slider 13 by the movement of the slider 13. The latch lever 38 is rotated counterclockwise by the actuating force of the spring 41.

In the disk apparatus 11 of FIG. 1, a carriage stopper 45 is provided. The carriage stopper 45 locks the head carriage 18 to the chassis 14 when the disk cartridge is ejected, so as to inhibit the contact of the heads 16 and 17 with the disk. The carriage stopper 45 includes a stopper body 45a which confronts the right-hand side of the guide shaft 24 and extends in the forward and backward directions A and B. The stopper body 45a is rotatably supported by a bearing portion (not shown) of the chassis 14 such that the carriage stopper 45 is rotatable in one of the rotating directions E and F perpendicular to the carriage movement directions A and B, similar to the lifter 24. Further, the carriage stopper 45 includes a rack 45b and a V-shaped recess 45c. The rack 45b is engaged with the head carriage 18 to lock the head carriage 18 to the chassis 14. The lifter 25 includes a connecting pin 25d extending from a rear end of the lifter 25 in the backward direction B, and the connecting pin 25d is fitted to the recess 45c of the carriage stopper 45.

In the disk apparatus of FIG. 1, a movable rack 56 is provided on the right-hand side of the head carriage 18, and the movable rack 56 confronts the rack 45b of the carriage stopper 45. The rack 45b has a longitudinal length corresponding to the distance between the innermost track and the outermost track of the disk. The length of the rack 45b corresponds to a stroke of the head carriage 18 when shifted in one of the forward direction A and the backward direction B. When the carriage stopper 45 is rotated upward in the rotating direction E, the rack 45b is engaged with the movable rack 56 so as to lock the head carriage 18 to the chassis 14.

In the disk apparatus of FIG. 1, a shaft 44 is provided on the chassis 14, and a stopper lever 46 is rotatably supported by the shaft 44. The stopper lever 46 includes an arm portion 46a, a spring connecting portion 46b and a connecting hole 46c. The arm portion 46a longitudinally extends from the base of the stopper lever 46 in the forward direction A. The spring connecting portion 46b laterally extends from the base of the stopper lever 46. The carriage stopper 45 includes a projection 45d extending from the rear end of the top of the stopper body 45a. The connecting hole 46c is formed into an elliptic shape, and the projection 45d of the carriage stopper 45 is fitted to the connecting hole 46c.

In the disk apparatus of FIG. 1, a helical torsion spring 47 is provided. The spring 47 has a first end 47a and a second end 47b. The spring 47 is connected at the end 47a to the spring connecting portion 46b of the stopper lever 46, and connected at the end 47b to the internal rear wall of the chassis 14. The spring 47 exerts an actuating force on the stopper lever 46 so as to rotate the stopper lever 47 clockwise around the shaft 44. That is, the stopper lever 46 is actuated in a carriage locking direction by the spring 47.

In the disk apparatus of FIG. 1, a solenoid 48 and a plunger 49 laterally extending from the left-hand side of the solenoid 48 are provided. When a drive signal from a control circuit (not shown) is sent to the solenoid 48, the solenoid 48 is driven so that the plunger 49 is moved in a lateral direction (indicated by the arrow D in FIG. 1) by an attracting force of the solenoid 48. The plunger 49 is connected at its leading edge to the arm portion 46a of the stopper lever 46. In FIG. 1 and FIG. 2, a lateral direction opposite to the lateral direction D is indicated by the arrow C, and, hereinafter, this lateral direction will be called the direction C. When the plunger 49 is moved in the direction D by the solenoid 48, the stopper lever 46 is rotated counterclockwise by the movement of the plunger 49. That is, the stopper lever 46 is actuated in a carriage unlocking direction by the plunger 49.

In the disk apparatus of FIG. 1, a holding member 50 and a guide shaft fixing member 51 are provided. The holding member 50 is formed by using a sheet metal material. The holding member 50 is fixed to the chassis 14, and the holding member 50 holds the stopper lever 46, the spring 47 and the solenoid 48 by pressing them downward. The guide shaft fixing member 51 is fixed to the internal rear wall of the chassis 14. The guide shaft fixing member 51 extends in the direction D perpendicular to the direction of the guide shaft 21, and fixes the end of the guide shaft 21 to the chassis 14.

In the disk apparatus of FIG. 1, only a single voice coil motor 52 is provided. A coil 53 of the voice coil motor 52 is integrally attached to the left-hand side of the head carriage 18. In the present embodiment, a center of gravity of the head carriage 18 is located at a left-biased position where the guide shaft 21 is located, and the voice coil motor 52 is located on the left-hand side of the guide shaft 21 such that the weight of the voice coil motor 52 and the weight of the head carriage 18 are balanced near the position of the guide shaft 21.

During a seek operation, the head carriage 18 with the heads 16 and 17 supported thereon is smoothly shifted in one of the directions A and B to a desired location of the disk by the voice coil motor 52. Hence, the disk apparatus 11 of the present embodiment is effective in providing a stable shifting movement of the heads 16 and 17 of the head carriage 18. After the head carriage 18 is shifted to the desired location of the disk, the heads 16 and 17 act to read information from or write information to the disk. In comparison with a head carriage mechanism in which a pair of voice coil motors are provided on both sides of the head carriage, the disk apparatus 11 of the present embodiment is more effective in providing a small-size head carriage having a light weight. The disk apparatus 11 of the present embodiment can reduce a shifting space needed to move the head carriage 18 within the disk apparatus 11, and this makes it possible to provide a small-size disk drive.

Figure 5:
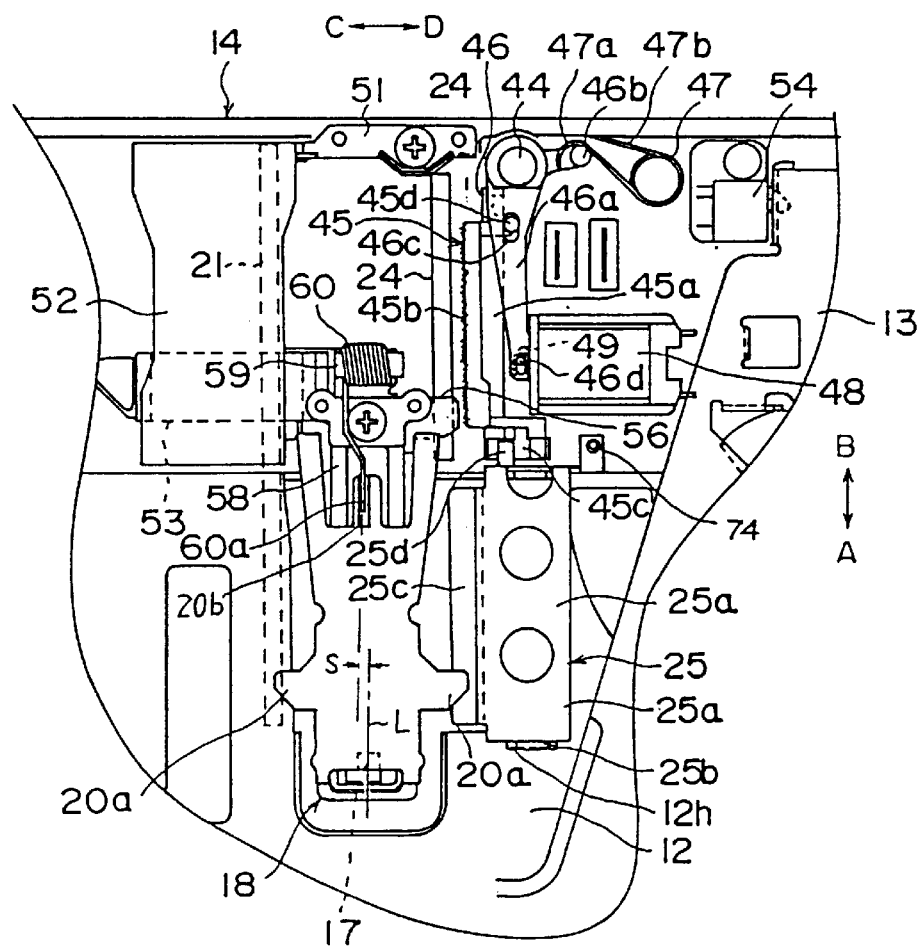
FIG. 5 is an enlarged top view of a head carriage in the disk apparatus when the disk apparatus is set in a read/write mode.

Next, FIG. 5 is an enlarged top view of the head carriage 18 in the disk apparatus 11 of the present embodiment when the disk apparatus 11 is set in a read/write mode.

As shown in FIG. 2 and FIG. 5, the head arm 20 is rotatably supported by a base 57 of the head carriage 18 through a leaf spring 58 of the head arm 20. The head arm 20 is vertically rotatable around the base 57 of the head carriage 18. The base 57 includes a laterally extending shaft 59 provided at the rear of the base 57. A helical torsion spring 60 is wound on the shaft 59. The spring 60 includes a pressing portion 60a extending from the base of the spring 60 in the forward direction A. The spring 60 has a leading edge of the pressing portion 60a connected to the head arm 20. The spring 60 exerts an actuating force on the head arm 20 so as to press the head arm 20 downward by the pressing portion 60a. The head arm 20 includes a recessed portion 20b formed on the top of the head arm 20. The leading edge of the pressing portion 60a is fitted into the recessed portion 20b of the head arm 20. The leading edge of the pressing portion 60a of the spring 60 is connected to the head arm 20 at a biased position as shown in FIG. 5, which will be described later.

The right-hand one of the lugs 20c of the head arm 20 presses the top of the connecting portion 25c of the lifter 25 downward by the actuating force of the spring 60. As described above, the connecting pin 25d of the lifter 25 is fitted to the recess 45c of the carriage stopper 45. Hence, the lifter 25 is vertically rotated around the shafts 25b in accordance with the rotating movement of the carriage stopper 45.

The plunger 49 is moved in the direction D by the attracting force of the solenoid 48, and the plunger 49 is connected to an end 46d of the arm portion 46a of the stopper lever 46. Hence, the stopper lever 46 is actuated in the carriage unlocking direction by the plunger 49. In addition, the spring connecting portion 46b of the stopper lever 46 is connected to the spring 47, and the stopper lever 46 is actuated by the actuating force of the spring 47 so as to rotate the stopper lever 46 clockwise around the shaft 44. Hence, the stopper lever 46 is actuated in the carriage locking direction by the spring 47. As the projection 45d of the carriage stopper 45 is fitted to the connecting hole 46c of the stopper lever 46, the carriage stopper 45 is rotated in the upward rotating direction E when the stopper lever 46 is rotated clockwise by the actuating force of the spring 47. By the upward rotation of the carriage stopper 45, the rack 45b of the carriage stopper 45 is engaged with the movable rack 56 of the head carriage 18, and the head carriage 18 is locked to the chassis 14 by the carriage stopper 45.

As shown in FIG. 5, in the disk apparatus 11, an ejection sensing switch 54 is provided at a rear position of the chassis 14. The ejection sensing switch 54 detects whether the slider 13 is moved in the backward direction B (or the ejecting direction of the slider 13). When the eject button 40 is pressed in the backward direction B, the slider 13 is moved in the backward direction B. The rear end of the slider 13 presses, when moved in the backward direction B, the ejection sensing switch 54, and the ejection sensing switch 54 is turned ON. Hence, the ejection sensing switch 54 detects whether the slider 13 is moved in the backward direction B.

Figure 6:
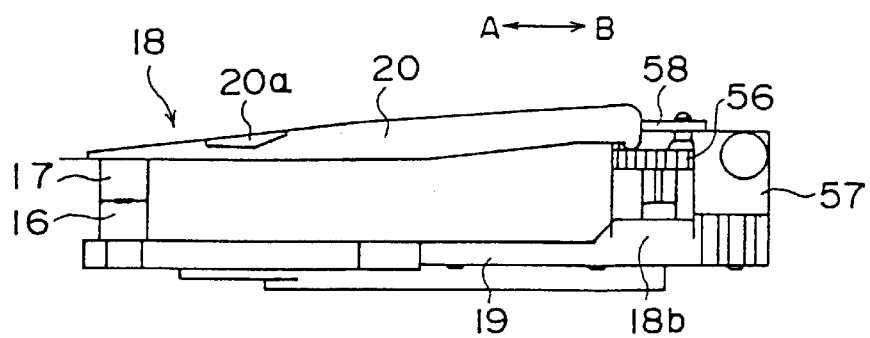
FIG. 6 is a side view of the head carriage in the disk apparatus.
Figure 7:
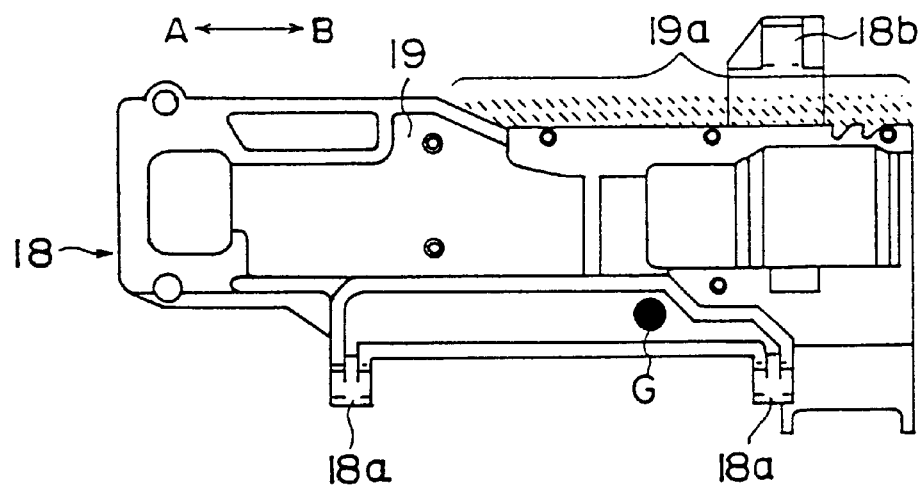
FIG. 7 is a bottom view of the head carriage in the disk apparatus.
Figure 8:
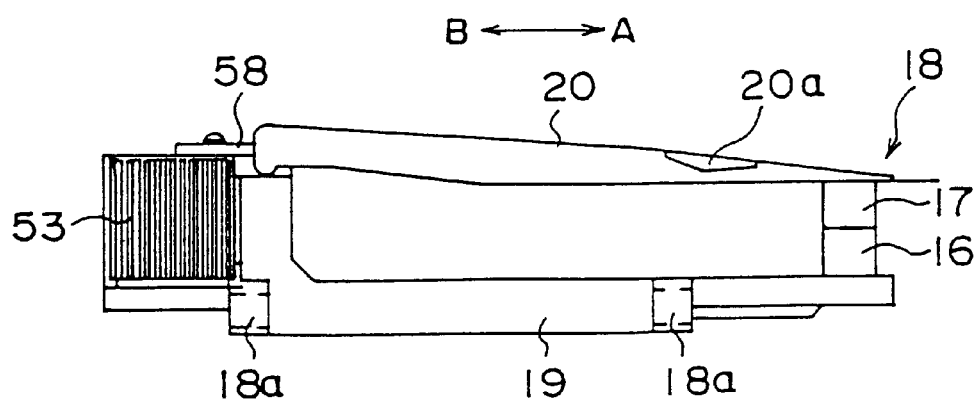
FIG. 8 is a side view of the head carriage in the disk apparatus.

Next, FIG. 6 is a right-hand side view of the head carriage 18 in the disk apparatus 11. FIG. 7 is a bottom view of the head carriage 18 in the disk apparatus 11. FIG. 8 is a left-hand side view of the head carriage 18 in the disk apparatus 11.

As shown in FIG. 6 through FIG. 7, the head carriage 18 includes the carriage body 19 which has the front end with the lower head 16 supported thereon, and the head arm 20 which has the front end with the upper head 17 supported thereon. The head arm 20 is rotatably supported at its rear end by the base 57 of the carriage body 19 through the leaf spring 58.

As shown in FIG. 7, the carriage body 19 has a cut-out portion 19a on the right-hand side of the carriage body 19. The cut-out portion 19a functions to adjust a position of a center of gravity (indicated by the black dot G in FIG. 7) of the head carriage 18 from the centerline to a left-biased location of the head carriage 18. The center of gravity G of the head carriage 18 is located in the vicinity of the bearing portions 18a which are connected to the guide shaft 21.

As shown in FIG. 5, the coil 53 of the voice coil motor 52 is integrally attached to the left-hand side of the carriage body 19 at the rear position. The coil 53 is located in the vicinity of the bearing portions 18a on the left-hand side of the carriage body 19. Hence, the actuating force of the coil 53 of the voice coil motor 52 can be smoothly exerted on the carriage body 19 at a position near the bearing portions 18a which are connected to the guide shaft 21. Therefore, the disk apparatus 11 of the present embodiment is effective in providing a stable shifting movement of the heads 16 and 17 of the head carriage 18.

Figure 9:
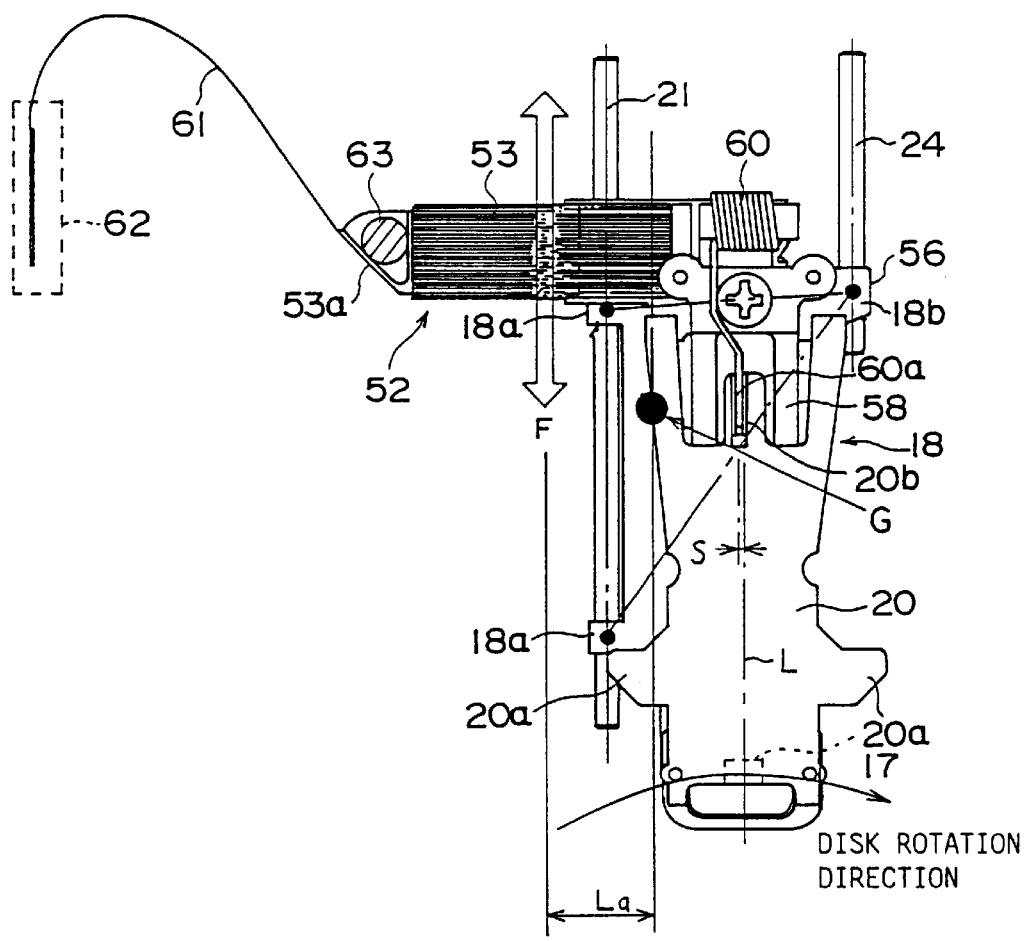
FIG. 9 is a top view of the head carriage in a mounted condition in the disk apparatus.
Figure 10:
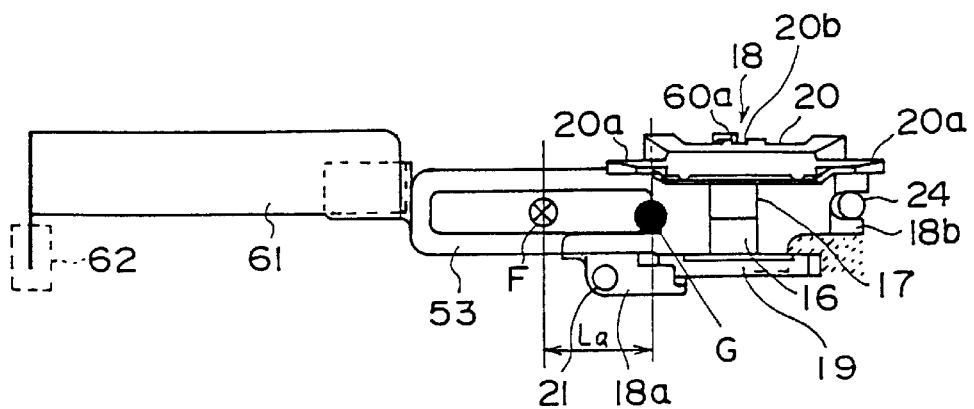
FIG. 10 is a front view of the head carriage in the mounted condition in the disk apparatus.

Next, FIG. 9 is a top view of the head carriage 18 in a mounted condition in the disk apparatus 11. FIG. 10 is a front view of the head carriage 18 in the mounted condition in the disk apparatus 11.

As shown in FIG. 9 and FIG. 10, the coil 53 of the voice coil motor 52 is integrally attached to the left-hand side of the carriage body 19 at the rear position, and the coil 53 produces an actuating force (indicated by the arrow "F" in FIG. 9) which is exerted on the head carriage 18 to shift the head carriage 18 in one of the directions A and B. The position of the head carriage 18 on which the actuating force F of the coil 53 is exerted is near the bearing portions 18a which are connected to the guide shaft 21.

As shown in FIG. 9, the center of gravity G of the head carriage 18 is located at the left-biased position adjacent to the guide shaft 21, and the position of the center of gravity G is within the range of a triangle (indicated by a one-dot chain line in FIG. 9) defined by the positions of the bearing portions 18a on the left-hand side of the head carriage 18 and the position of the bearing portion 18b on the right-hand side of the head carriage 18.

The bearing portions 18a are main bearing parts of the head carriage 18 which support the shifting movement of the head carriage 18 and restrict the lateral and vertical positions of the head carriage 18. Each of the bearing portions 18a is formed with a circular hole, and the guide shaft 21 is passed through the bearing portions 18a. The bearing portion 18b is a subsidiary bearing part of the head carriage 18 which supports the shifting movement of the head carriage 18 and restricts only the vertical position of the head carriage 18. The bearing portion 18b is formed with a C-shaped hole, and the guide shaft 24 is loosely fitted in the bearing portion 18b.

As shown in FIG. 9, the actuating force F of the coil 53 acts on the head carriage 18 at a position on the left side of the guide shaft 21 to which the bearing portions 18a are connected. The center of gravity G of the head carriage 18 is located at a position on the right side of the guide shaft 21 to which the bearing portions 18a are connected. Suppose that there is a small distance (indicated by the arrow La in FIG. 9 and FIG.10) of the center of gravity G of the head carriage 18 to the direction of the actuating force F of the coil 53. In the present embodiment, the guide shaft 21 is positioned about in the middle of the distance La of the center of gravity G of the head carriage 18 to the direction of the actuating force F of the voice coil motor 52, and the center of gravity G, the guide shaft 21 and the centerline of the coil 53 are in close proximity to one another.

Further, during a seek operation of the disk apparatus 11 of the present embodiment, the disk is rotated in a disk rotation direction, indicated by the arrow in FIG. 9, and an air flow between the rotating disk and the head carriage 18 exerts a lateral right-facing force on the head carriage 18 in the disk rotation direction. However, in the present embodiment, the voice coil motor 52 is provided on the left-hand side of the head carriage 18 which is an air-inlet side of the head carriage with respect to the disk rotation direction. The shifting movement of the head carriage 18 is supported by the guide shaft 21 at the two bearing portions 18a on the left-hand side of the head carriage 18. In addition, the actuating force of the coil 53 of the voice coil motor 52 is smoothly exerted on the carriage body 19 at a position near the bearing portions 18a which are connected to the guide shaft 21. Hence, it is possible for the disk apparatus 11 of the present embodiment to withstand the lateral right-facing force of the air flow and provide a stable shifting movement of the heads 16 and 17 of the head carriage 18. It is possible for the head apparatus 11 of the present embodiment to prevent the lateral swinging motion of the heads 16 and 17 of the head carriage 18 even when the disk is rotated at a high speed.

As shown in FIG. 9 and FIG. 10, in the disk apparatus 11 of the present embodiment, a flexible printed-circuit cable 61 and a connector 62 are provided. The connector 62 is provided on the chassis 14. The flexible printed-circuit cable 61 is electrically connected at one end to a wire taken from an end 53a of the coil 53, extends to the connector 62 on the chassis 14, and electrically connected at the other end to the connector 62. As shown in FIG. 9, the flexible printed-circuit cable 61 is in a curved condition, and exerts a resilient restoring force on the coil 53. However, in the present embodiment, the guide shaft 21 is positioned about in the middle of the distance La of the center of gravity G of the head carriage 18 to the direction of the actuating force F of the voice coil motor 52, and the center of gravity G, the guide shaft 21 and the centerline of the coil 53 are in close proximity to one another. Hence, it is possible for the disk apparatus 11 of the present embodiment to withstand the resilient restoring force of the flexible printed-circuit cable 61 and provide a stable shifting movement of the heads 16 and 17 of the head carriage 18.

Further, in the disk apparatus 11 of the present embodiment, a balancer weight 63 (indicated by the shading lines in FIG. 9) may be provided. The balancer weight 63 is secured to the end 53a of the coil 53 in order to eliminate the vibration of the head carriage 18 which may be produced during a seek operation. The balancer weight 63 functions to avoid the resonance of the head carriage 18 by changing the vibration frequency of the head carriage 18. Further, in the disk apparatus 11 of the present embodiment, the leading edge of the pressing portion 60a of the spring 60 is connected to the head arm 20 at the biased position as shown in FIG. 9. The biased position of the leading edge of the spring 60 is deviating from a centerline L (indicated by the one-dot chain line in FIG. 9) of the heads 16 and 17 of the head carriage 18 by a small distance indicated by the arrow S in FIG. 9. The biased position of the leading edge of the spring 60 functions to avoid the resonance of the head carriage 18 by changing the vibration frequency of the head carriage 18.

As described above, in the disk apparatus 11 of the present embodiment, the head carriage 18 is shifted in a radial direction of the disk by a single voice coil motor 53. The disk apparatus 11 of the present embodiment is effective in providing a stable shifting movement of the heads 16 and 17 of the head carriage 18. In comparison with a head carriage mechanism in which a pair of voice coil motors are provided on the sides of the head carriage, the disk apparatus 11 of the present embodiment is more effective in providing a small-size head carriage having a light weight. The disk apparatus 11 of the present embodiment can reduce a shifting space needed to move the head carriage 18 within the disk apparatus 11, and this makes it possible to provide a small-size disk drive. Further, the disk apparatus 11 of the present embodiment provides a light-weight head carriage and does not produces an excessively large force during an impact test, and it is effective in providing a good impact resistance.

In the above-described embodiment, the disk apparatus of the present invention is applied to a magnetic disk drive in order to give an example of the disk apparatus. However, the present invention is not limited to the above-described embodiment. It is a matter of course that the disk apparatus of the present invention may be applied to an optical disk drive, a magneto-optical disk drive or a disk drive which accesses another type of storage medium, such as a memory card.

In the above-described embodiment, the disk apparatus is configured such that the slider is movable on the top of the disk holder. However, the present invention is not limited to the above-described embodiment. It is a matter of course that the disk apparatus of the present invention may be configured such that the slider is movable on the bottom of the disk holder.

Further, the present invention is not limited to the above-described embodiment, and variations and modifications may be made without departing from the scope of the present invention.

The present invention is based on Japanese priority application No.9-312,366, filed on Nov. 13, 1997, the entire contents of which are hereby incorporated by reference.

What is claimed is:

1. A disk apparatus comprising:
    a read/write head for reading information from or writing information to a recording disk;
    a movable head carriage for supporting the head thereon, the head carriage having a first and a second side and bearing portions provided on said first side thereof;
    at least a first guide shaft provided on said first side of the head carriage, said first guide shaft having a centerline parallel to a direction of a movement of the head relative to the disk, said bearing portions of the head carriage being fitted to said first guide shaft in order to guide the movement of the head when the head carriage is shifted;
    a second guide shaft provided on said second side of said head carriage for slidably supporting said second side of said head carriage; and
    a voice coil motor, having a coil attached to said first side of the head carriage, for shifting the head carriage in one of the radial directions of the disk by exerting an actuating force on the head carriage, the coil of the voice coil motor having a centerline along which the actuating force of the voice coil motor is exerted to shift the head carriage,
    wherein the center of gravity of the head carriage is positioned opposite to the centerline of the coil along which the actuating force of the voice coil motor is exerted, with respect to said centerline of said first guide shaft.

2. The disk apparatus according to claim 1, wherein the recording disk is a magnetic disk, and the read/write head reads information from or writes information to the magnetic disk when the magnetic disk is rotated at a given speed.

3. The disk apparatus according to claim 1, wherein the voice coil motor is provided on an air-inlet side of the head carriage with respect to a disk rotation direction of the disk.

4. The disk apparatus according to claim 1, wherein the disk apparatus has a distance of the center of gravity of the head carriage perpendicular to a direction of the actuating force of the voice coil motor, and said first guide shaft is positioned about in the middle of the distance of the center of gravity of the head carriage to the direction of the actuating force.

5. The disk apparatus according to claim 1, wherein the head carriage has a cut-out portion on said second side thereof opposite to said first guide shaft.

6. A disk apparatus comprising:

a read/write head for reading information from or writing information to a recording disk;

a movable head carriage for supporting the head thereon, the head carriage having a first and a second side and bearing portions provided on said first side thereof;

at least a first guide shaft provided on said first side of the head carriage, the guide shaft having a centerline parallel to a direction of a movement of the head relative to the disk, said bearing portions of the head carriage being fitted to the guide shaft in order to guide the movement of the head when the head carriage is shifted; and a voice coil motor, having a coil attached to said first side of the head carriage, for shifting the head carriage in one of the radial directions of the disk by exerting an actuating force on the head carriage, the coil of the voice coil motor having a centerline along which the actuating force of the voice coil motor is exerted to shift the head carriage, wherein the center of gravity of the head carriage is positioned opposite to the centerline of the coil along which the actuating force of the voice coil motor is exerted, with respect to said centerline of the said first guide shaft; and wherein the disk apparatus further includes a second guide shaft shorter than said first guide shaft and provided on said second side of the head carriage opposite to said first guide shaft, the head carriage being supported on both the first and second guide shafts.

* * * * *